June 13, 1961 A. V. BENDER ET AL 2,988,248
PAINT COLORANT DISPENSER
Filed March 30, 1959 2 Sheets-Sheet 1
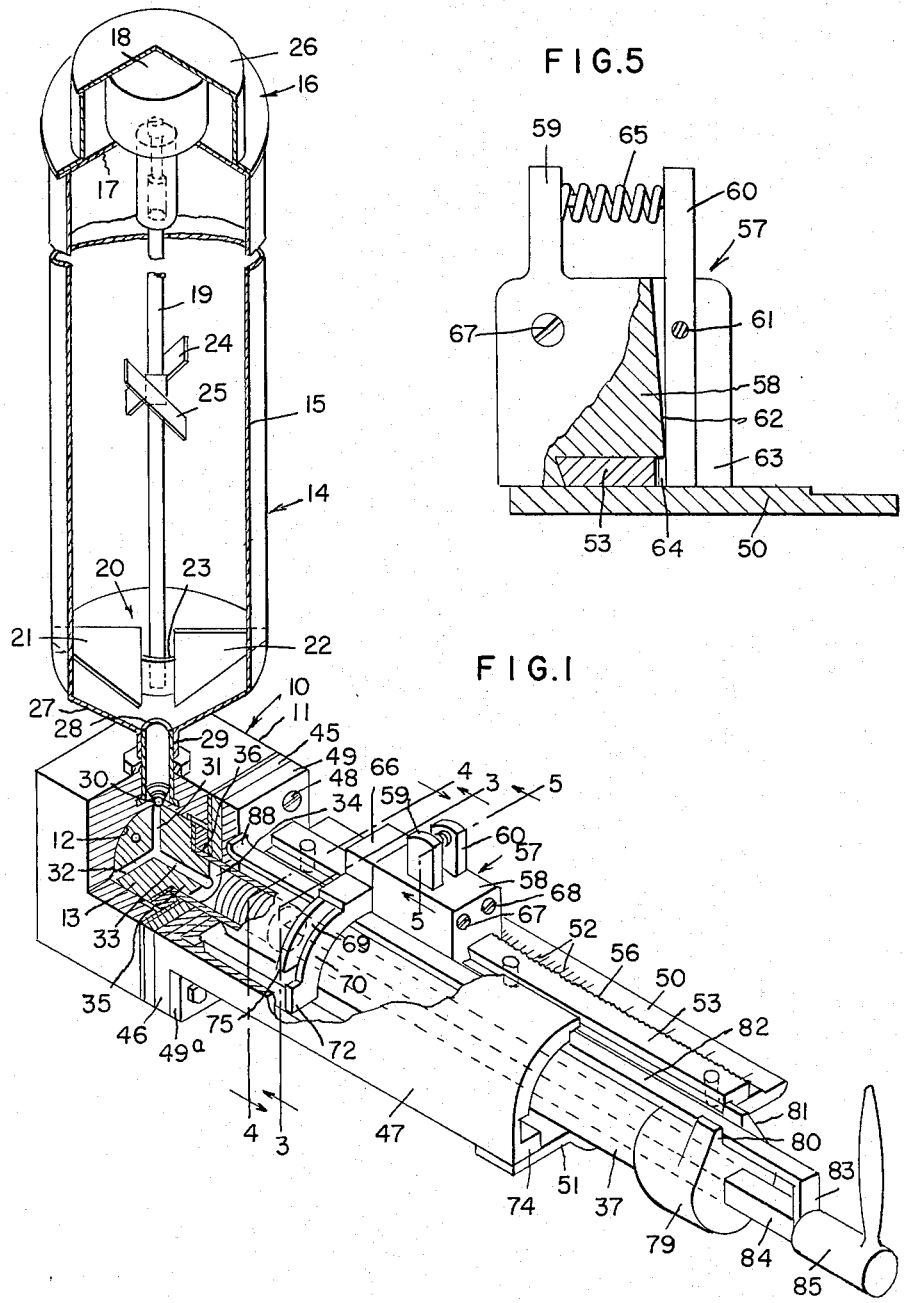
INVENTORS
Arthur V. Bender
BY Roy W. Bogseth
ATTYS

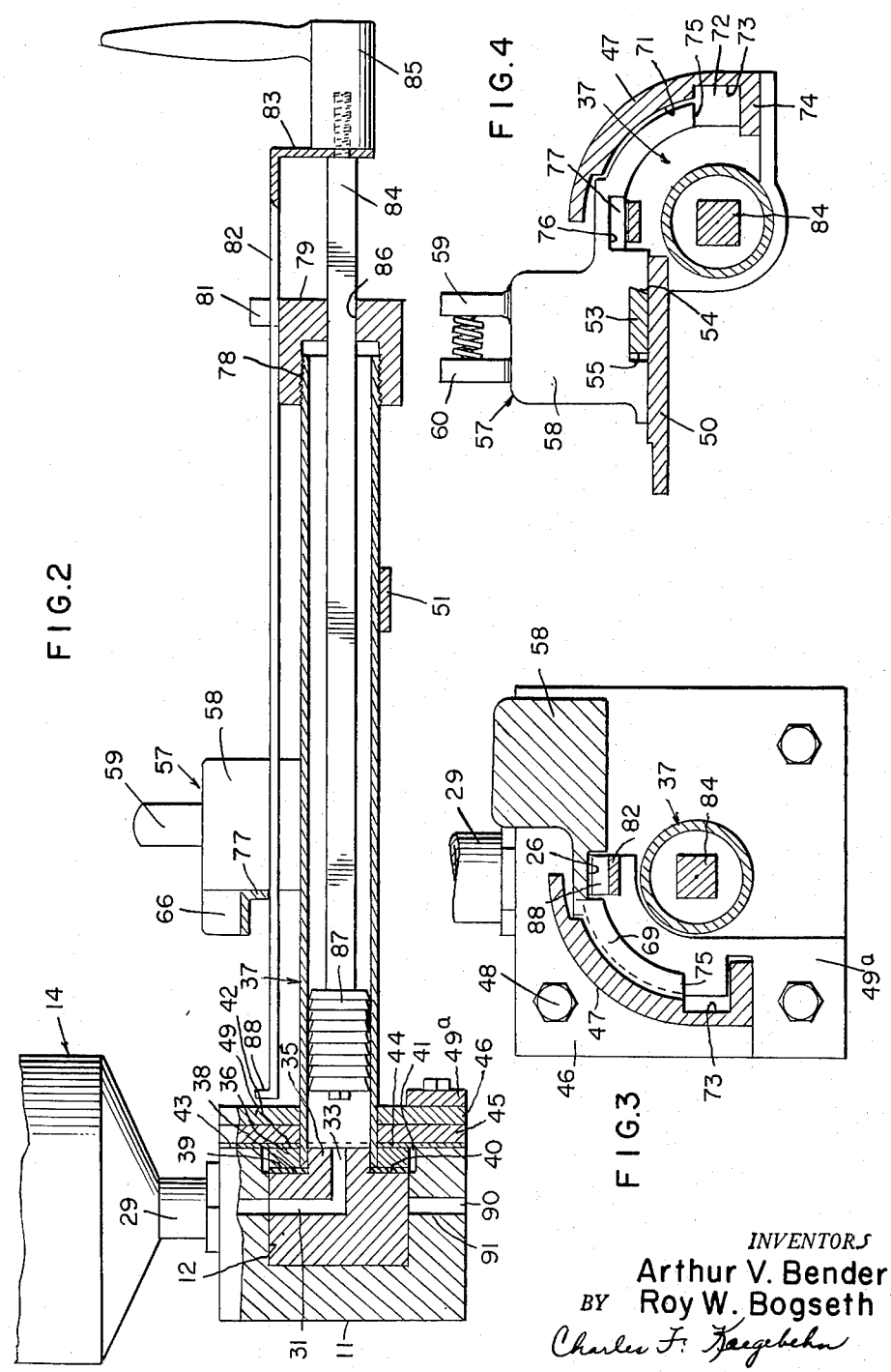

2,988,248
PAINT COLORANT DISPENSER
Arthur V. Bender, Maplewood, N.J., and Roy W. Bogseth, Long Island City, N.Y., assignors to National Lead Company, New York, N.Y., a corporation of New Jersey
Filed Mar. 30, 1959, Ser. No. 802,813
7 Claims. (Cl. 222—235)

This invention relates to dispensing apparatus and pertains more particularly to a device for dispensing a predetermined quantity of material.

In the mixing and blending of paints for matching purposes, or to duplicate an established mixture, it is necessary, of course, to accurately measure and mix the proper quantity of desired colors together so as to produce, in the finished mixture, the proper shade and color. Naturally, any conventional means for measuring out the various quantities of desired colors to be mixed can be employed although, under most circumstances, such a procedure is relatively time consuming, and in business establishments dealing with the sale of paints and paint products, it is desirable to have some form of mechanism which will accurately measure and dispense desired quantities of various basic colorants to be mixed together with a base color, such as white, so as to produce a desired shade of paint. It is, therefore, a primary objective of this invention to provide such a mechanism which will permit the measuring and dispensing of paint colorants with a minimum of ease and with such rapidity as to be practically used in an establishment dealing with the sale of paints and paint products.

A further object of this invention is to provide a dispensing mechanism of the character generally described above which incorporates a reservoir containing a relatively large quantity of colorant and associated therewith a measuring and dispensing device for withdrawing predetermined quantities of the colorant from the reservoir for dispensing into a container within which the blended paint is to be obtained.

A further object of this invention is to provide a device in accordance with the immediately preceding object wherein mechanism is incorporated within the reservoir for effecting the stirring of the colorant so as to assure a homogeneous character thereof permitting the duplication of known or standard mixes or blends of paints or for originating a desired mix or blend which can be later reproduced with accuracy and with assurance that the proper shade will be achieved in each case.

Another object of this invention is to provide a measuring and dispensing device incorporating a valve block having a reservoir mounted thereon and housing a rotatable valve member to which is connected a measuring and dispensing cylinder, the cylinder and valve being rigid with each other and mounted for rotation about the axis of the cylinder and in which one position of the valve and cylinder communicates the reservoir with the cylinder and with another position of the valve being operative to isolate the cylinder from the reservoir and establish a discharge port communicating with the cylinder so as to dispense the colorant contained within the cylinder into a suitable receptacle or the like.

Another object of this invention is to provide a measuring and dispensing assembly consisting essentially of a valve block assembly including an outer housing having a rotary valve member housed therewithin and serving as a mount for a colorant reservoir, with there being a passageway communicating the colorant with the valve body and the valve body having a cylinder rigid therewith and extending axially therefrom, there being a platform rigid with the housing extending alongside the cylinder and including a stop mechanism movable therealong and able to be disposed in any number of predetermined fixed positions therealong, there being a piston reciprocable within the cylinder and having a stop bar rigid therewith engageable with the stop mechanism to limit the outward movement of the piston within the cylinder for withdrawing a predetermined quantity of colorant from the reservoir, and the stop mechanism including means permitting the piston and its locking bar to be rotated to such position and carrying the cylinder for rotation therewith that the valve body is out of communication with the reservoir and communicates with a discharge passage in the housing, whereby movement of the piston to plunge it home within the cylinder will effect the dispensing of the predetermined measured quantity of colorant.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

FIG. 1 is a perspective view, partly broken away, showing the dispensing mechanism in its entirety and illustrating the relative disposition of component parts as well as the relative position of the piston within the cylinder at the start of the cycle of a measuring and dispensing operation;

FIG. 2 is a vertical longitudinal section taken through the assembly shown in FIG. 1 and showing the piston and its stop bar, with the former being bottomed within the cylinder, and the manner in which the cylinder and rotary valve body are associated with each other;

FIG. 3 is an enlarged transverse section taken substantially along the plane of section line 3—3 in FIG. 1, illustrating certain details of the stop mechanism;

FIG. 4 is an enlarged transverse section taken substantially along the plane of section line 4—4 in FIG. 1, showing certain other details of the stop mechanism; and FIG. 5 is an enlarged transverse sectional view taken generally along the plane of section line 5—5 in FIG. 1, showing the locking mechanism for the stop assembly.

Referring now more particularly to FIG. 1, reference numeral 10 indicates in general a valve block assembly consisting of the outer valve block or housing 11 having a cylindrical bore 12 therewithin receiving a cylindrical valve body 13 with such valve body being rotatable within such bore for movement between two positions as will hereinafter be more fully described.

Mounted on the block 11 is a reservoir assembly indicated generally by the reference character 14 which may take the form of a cylindrical casing 15 having a removable cover assembly 16 at its upper end and by means of which colorant may be introduced into the reservoir. The cover assembly includes a base plate 17 upon which is mounted a suitable source of power, such as electric motor 18 and its drive shaft directed downwardly through the base plate 17 and having a drive shaft extension 19 projecting axially within the casing 15 terminating just short of the bottom thereof and carrying thereat a paddle assembly indicated generally by the reference character 20 which may include one or more angled paddles 21 and 22 connected to the drive shaft extension 19 by means of a suitable interconnecting web 23, it being preferred that the drive shaft extension 19 also carry auxiliary paddles 24 and 25 for creating a stirring action somewhere adjacent the midportion of the casing. Cap 26 may be provided for covering the motor 18.

The purpose of the motor 18 and its associated paddles is to agitate the colorant within the reservoir and maintain the same mixed and prevent sedimentation or stratification thereof and assuring a homogeneous nature of the colorant.

The bottom wall 27 of the casing 15 is provided with an aperture 28 within which is fitted the tube 29 which projects therefrom downwardly into the block or housing 11, terminating just short of the bore 12 therein. At this point, the block or housing 11 is provided with an opening or passageway 30 leading to the valve body 13 and, in one position of the valve body, communicating directly with the radial valve body passageway 31. Such radial passageway 31 extends to the center of the valve body and intersects thereat a further radial valve body passageway 32 disposed substantially at right angles to the passageway 31 and an axially extending valve body passageway 33 which extends from such point of intersection to open upon the outer face 34 of the valve body. Adjacent the outer face 34, the valve body is of reduced diameter as indicated by the reference character 35 and embracing this reduced portion of the valve body is the inner end portion 36 of the cylinder assembly 37, see particularly FIG. 2. Such inner end portion 36 of the cylinder may be provided with an integral annular foot flange 38, with there being a gasket 39 disposed between such flange and the valve body face 40. It is essential that the cylinder and valve body be rigidly interconnected so that they rotate in unison and to this end, the end 36 of the cylinder may be snugly engaged over the reduced end portion 35 of the valve body or the flange 38 may be bolted directly to the valve body, or by any other desirable means the two may be attached together. In any event, as stated above, the cylinder and valve body are rigidly interconnected.

To prevent binding between the flange 38 and the block or housing 11, a counterbore 41 is provided in the block clearing the periphery of the flange 38, substantially as shown. The outer face 42 of flange 38 and the outer face 43 of the block 11 are substantially coplanar and fitted against these surfaces is a gasket 44 maintained in contact with such faces by means of a cover plate 45. Engaged against the left half of cover plate 45 is a flange plate 46 having an outstanding guide and cover member 47, see particularly FIG. 1, rigid therewith and which cover member extends in the direction of the cylinder 37 and partially houses the same leaving one side and the bottom thereof uncovered, substantially as shown. Suitable machine screws or other fasteners 48 extend through the flange 46, the cover plate 45 and into the housing or block 11 for holding these elements rigidly together. Engaged against the right half of cover plate 45 is a flange plate 49 and rigidly attached at a right angle thereto is a table 50 extending alongside the cylinder 37 and parallel thereto. The table is provided with an outboard crossover bar 51 which extends below the cylinder and directly beneath the cover 47 and is attached thereto to lend support to the free or outer end of the cover. A wear plate flange 49A is mounted on the outside face of flange plate 46 and extends around the inside arc of cover member 47, forming a wearing surface so the upturned end 88 of stop bar 82 (hereinafter fully described) may butt against it.

The table 50 is provided with indicia or graduations 52 along the length thereof, the purpose of which will be presently apparent and affixed along the upper surface thereof parallel to the cylinder 37 is a guide bar 53 having a beveled undercut side edge 54 and having its opposite edge 55 provided with serrations or teeth therealong such as are indicated by the reference character 56 in FIG. 1. A combined stop and locking mechanism indicated generally by the reference character 57 is engaged with the bar 53 for movement therealong to any one of a number of positions corresponding to the graduations 52 on the table. This mechanism consists essentially of a generally rectangular body 58 having a notched undersurface conforming in cross section generally with the cross section of the bar 53 but slightly wider than the bar to permit free passage of this body therealong. The upper side of the body is provided with an upstanding ear 59 rigid therewith and cooperable with this ear is the upper end portion 60 of a locking lever which is pivoted intermediate its ends as by the pin 61 carried by the body 58 and which projects downwardly through a vertical notch 62 in the body, which opening intersects the bottom notch in the body 58. A lower end 63 of the lever is provided on one side thereof with one or more locking teeth or pawls 64 engageable with the serrations or teeth 56 along the corresponding side edge 55 of the locking bar, and there is a spring 65 interposed between the two portions 59 and 60 normally spacing and urging them apart so that the teeth 64 or pawls are engaged with the guide bar serrations so as to lock the body 58 to the guide bar and fix the position of the same along the length of the table 50.

The passageway 62 is so formed as to permit the locking lever to be pivoted about the pin 61 and disengage the teeth 64 at the lower end 63 thereof from the serrations along the corresponding edge of the guide bar and thus permit bodily movement of the combined stop and locking assembly 57 to various adjusted positions along the length of the table.

Fixed to the forward end of the body 58 is a laterally extending stop 66, the fasteners or machine screws 67 and 68 serving to effect the attachment of such body 66 to the body 58 and it being preferred that the fastener 68 form the pivot pin 61 for the locking lever. The stop member 66 projects laterally from the body 58 and passes over and around the cylinder 37 and presents two tongues 69 and 70, bridged for structural support, disposed in spaced apart relationship and arcuate concentrically about the center of the cylinder 37. The cover 47 is provided with an arcuate inner surface 71 just clearing the outer edges of the legs 69 and 70 and the leg 70 is provided with a foot portion 72 laterally enlarged so as to engage within a vertical notch 73 in the inner surface of the housing or cover 47 and has its lower edge just clearing the upper surface of the inwardly projecting ledge 74 of the cover so that, as the combined locking and stop mechanism 57 is slid along the length of the table 50, the leg 70 will form a guide for this assembly relative to the cover 47. The lower end 75 of the leg 69, however, is spaced above the upper surface of the ledge 74 for a purpose which will be presently apparent, and the leg 69 is also provided with an upwardly extending notch 76 to provide a clearance space whose purpose will be presently apparent. Directly opposite the notch 76, the portion 77 of the leg 70 forms a stop surface as will also be presently apparent.

The cylinder 37 is provided with an externally threaded free end portion 78 and has a cap 79 engaged thereon, such cap being provided with a pair of upstanding ears 80 and 81 which are disposed in spaced apart relationship and which receive therebetween a stop bar 82 extending axially parallel to the cylinder 37. The outer end 83 of this stop bar is laterally directed and joined with a piston rod 84 externally of the cylinder and cap, the piston rod also being provided with a handle 85 at this point. The cap 79 is provided with a square or otherwise non-circular opening 86 conforming in contour and shape to the cross section of the piston rod 84 and passes axially into the cylinder 37 and has rigidly affixed to its free end a piston indicated by the reference character 87. The piston assembly and its rod and the stop bar 82 are substantially co-extensive in length and the forward or free end of the bar 82 is upturned as indicated by the reference character 88, and will permit inward movement of the piston until such point as the forward face of the upturned portion 88 of the stop bar butts against the outer surface of the flange 49A.

In the operation of the device, the reservoir 14 contains a quantity of colorant and the initial position of the assembly is with the piston completely retracted within the cylinder and the stop finger 88 on the bar 82 butting against the outer face of the flange 49A. Then, in accordance with the quantity of colorant desired to be withdrawn from the reservoir, the assembly 57 is moved along the table 50 to a point indicated by the markings 52 and locked in this position by releasing the lever 60. The handle 85 is then withdrawn until the stop finger 88 passes through the notch 76 in the laterally directed member 66 and engages against the portion 77 of the leg 70, see particularly FIGS. 2 and 4. During this movement, the valve 13 is in the position shown in FIG. 1 and the withdrawing movement of the piston meters a measured quantity of liquid colorant from the reservoir 14 into the cylinder. At this point, with the stop finger 88 engaged against the inner face of the leg 70, the handle 85 is rotated in a counterclockwise direction until it passes and clears below the lower end edge 75 of the leg 69 and bottoms against the upper surface of the ledge 74 of the cover 47. At any intermediate point, the piston cannot be shoved home but as soon as the finger 88 clears the end edge 75 of the leg 69, the piston may be forced home until it has been bottomed to cause the dispensing of the colorant from the cylinder. At the time that the handle 85 is being rotated in a counterclockwise direction, a corresponding movement is imparted to the cylinder and, consequently, to the valve 13 which will move the passageway 31 thereof out of communication with the reservoir 14 and will communicate the passageway 32 with the discharge port 90 in the bottom of the block 11. To repeat the cycle of operations, the cylinder must be rotated back to its initial position to secure communication between the reservoir 14 and the cylinder.

From the above, it will be readily apparent that by designating various tints and shadings by basic mixtures corresponding with proportions as indicated by the calibrations 52, any particular shade or color can be duplicated at will and at any time. For example, a number of the units described herein may be mounted on a common supporting base. Each of these units could contain a separate and distinct base colorant material. Therefore, if a certain shade of paint may be designated as containing so much quantity of base colorant, such as white, with the addition of forty parts, corresponding to the indicia marking the graduations 52, of one colorant, sixty of another colorant in a separate, but identical, unit and so on, so that the various colorants are dispensed in the proper amount by setting the assembly 57 at the proper positions and in measuring out and dispensing this particular amount of those colorants into the basic mixture.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. Mechanism for measuring and dispensing paint colorants and the like, comprising a valve block assembly including an outer housing having a bore therein and a valve rotatable within said bore, a cylinder rigid with said valve and extending therefrom outwardly of said housing with its axis coincidental with the axis of rotation of said valve, a table fixed to said housing and extending therefrom generally parallel with said cylinder, stop mechanism mounted on said table and movable therealong parallel to the axis of said cylinder to any one of a number of predetermined fixed positions therealong and including structure overlying said cylinder, a piston within said cylinder and having a piston rod rigid therewith projecting axially through the cylinder and outwardly thereof, means connecting said piston rod with said cylinder permitting reciprocation of the piston rod with respect thereto but preventing relative rotation therebetween, a stop bar rigid with said piston rod and extending axially along and outside said cylinder, there being means on said stop bar engageable with said stop mechanism structure limiting movement of said piston away from the valve in accordance with the fixed position of the stop mechanism, a reservoir mounted on said housing and communicating with said valve receiving said valve, said housing having a dispensing port communicating with said bore containing said valve, and there being passageways in said valve communicating said cylinder with said reservoir only when the valve is in one position and said cylinder with said dispensing port only in another position of said valve, the valve being rotatable between such positions in response to rotary movement imparted to said cylinder, said stop mechanism structure including a pair of arcuate legs disposed in spaced parallel relationship and partially embracing and overlying said cylinder, said means on the stop bar engageable with said structure being in the form of an upturned end portion on the stop bar movable into position engaging the inner face of one of said legs and permitting rotation of the cylinder with such means between said legs to a position in which the cylinder is communicated only with said dispensing port, the other of said legs terminating short of the terminal point of the first mentioned leg permitting said means to pass thereunder to permit said piston to ram home within said cylinder to dispense colorant contained within the cylinder through the dispensing port.

2. The assembly as defined in and by claim 1 wherein said stop mechanism includes a body member movable along said table, there being a guide bar fixed to said table having one undercut beveled edge cooperating with and received within said body member to guide the same therealong with the opposite edge of said guide bar being serrated, and pawl mechanism carried by said body member normally engaged with said serrated edge but movable away therefrom.

3. The assembly as defined in and by claim 1 wherein said bore opens to one side of said housing, said table being rigid with a cover plate mounted on said one side of the housing and serving to retain said valve therewithin.

4. The assembly as defined in and by claim 1 wherein said reservoir is provided with means for continually stirring and agitating colorant contained therewithin.

5. The assembly as defined in and by claim 1 wherein a cover member is mounted on said housing extending along said cylinder and partially covering the same, said cover overlapping said portion of the stop mechanism overlying said cylinder and serving as a guide therefor, said cover being provided with a ledge effective as a limit stop for said means on the stop bar to establish one position of said valve and cylinder.

6. The assembly as defined in and by claim 1 wherein a cover member is mounted on said housing and extends therefrom generally parallel to said cylinder and in partially covering relation thereto and overlying said arcuate legs of the stop mechanism, said cover having a ledge formed on its inside surface effective as a guide for said terminal end of the first mentioned leg with the upper surface of said ledge serving as a limit stop for said means on the stop bar to fix one position of said valve.

7. A mechanism for measuring and dispensing paint colorants and the like, comprising a hollow body having a valve chamber therein, said body having a discharge passage leading from said chamber, and an inlet passage leading into said chamber, a valve rotatably mounted in said body and having passageways therein alignable with said inlet and discharge passageways in the body, the valve passageways being in communication with each other and being so disposed in the valve that only one of such passageways is in alignment with the inlet and outlet passageways in the body at any one time, said valve also having a third passageway therein intersecting the first two mentioned passageways and extending coaxially of the axis of rotation of said valve and opening upon one end thereof, a cylinder fixed to said one end of the valve and having communication with said axial passageway therein, a reservoir fixed to said body and communicating with said inlet port therein, a piston in said cylinder having a piston rod fixed thereto and projecting outwardly through the end of said cylinder opposite said valve, a stop bar rigid with said piston rod and extending along said cylinder exteriorly thereof, said stop bar having a stop ear thereon projecting laterally therefrom, a table fixed to said body and extending therefrom in underlying relationship to said cylinder, a stop carriage mounted on said table for disposition in various selected adjusted positions therealong in a direction parallel to said cylinder and immediately adjacent thereto, an arm fixed to said carriage extending partially around said cylinder, said arm having a groove therein having spaced openings therefrom facing said body and both of which openings are of a dimension to pass said stop ear therethrough with the stop ear being captive in any other position within said groove to prevent reciprocation of said piston when the stop ear is in such groove but out of registry with one or the other of such openings, the positioning of said openings corresponding to positions of said valve wherein on one hand one of said passageways in the valve is in register with the inlet port of the body and on the other hand when the second mentioned of said passageways in the valve is in register with the outlet port of the valve body.

References Cited in the file of this patent
UNITED STATES PATENTS

| | | |
|---|---|---|
| 2,198,666 | Gruskin | Apr. 30, 1940 |
| 2,768,581 | Langemack | Oct. 30, 1956 |
| 2,917,206 | Nagy | Dec. 15, 1959 |